United States Patent [19]
Umetsu

[11] Patent Number: 5,293,191
[45] Date of Patent: Mar. 8, 1994

[54] CAMERA

[75] Inventor: Takao Umetsu, Omiya, Japan

[73] Assignee: Fuji Photo Optical Co., Ltd., Omiya, Japan

[21] Appl. No.: 86,122

[22] Filed: Jul. 6, 1993

[30] Foreign Application Priority Data

Jul. 24, 1992 [JP] Japan .................. 4-198623

[51] Int. Cl.$^5$ .............................. G03B 1/18
[52] U.S. Cl. .................................. 354/173.1
[58] Field of Search ................. 354/173.1, 173.11

[56] References Cited

U.S. PATENT DOCUMENTS

| | | | |
|---|---|---|---|
| 4,855,772 | 8/1989 | Hashimoto et al. | 354/173.1 |
| 4,887,115 | 12/1989 | Inoue et al. | 354/289.1 |
| 5,119,119 | 6/1992 | Amano et al. | 354/106 |
| 5,134,431 | 7/1992 | Ishimura et al. | 354/400 |
| 5,164,761 | 11/1992 | Isono et al. | 354/468 |

FOREIGN PATENT DOCUMENTS 1-314232  12/1989  Japan .

Primary Examiner—M. L. Gellner
Assistant Examiner—Nicholas J. Tuccillo
Attorney, Agent, or Firm—Oliff & Berridge

[57] ABSTRACT

A central processing unit (CPU) is reset during the removal of a battery or the voltage drop, while, in an electrically erasable/programmable read-only memory (EEPROM), there is stored and held information of the camera operation immediately before the reset and the number of film frames. Then, when the CPU becomes operable by the exchange of batteries and the like, the information of camera operation immediately before the reset and the number of film frames are read out from the EEPROM during the processing at the initial stage thereafter, the operations corresponding to the information of camera operation is continued and the number of film frames thus read out is changed by one and set as the film count value when the information of camera operation indicates one frame delivery. With this arrangement, the interrupted frame delivery is also counted as one frame, so that the final frame is prevented from entering a photographing preventing region of a film.

4 Claims, 4 Drawing Sheets

CAMERA

BACKGROUND OF THE INVENTION 1. Field of the Invention

This invention relates to a camera, and more particularly to processing of the number of film frames in a camera incorporating therein an electrically erasable/programmable read-only memory (hereafter referred to as a "EEPROM"). 2. Description of the Related Art There has heretofore been provided a so-called preparatory winding type camera wherein, after a film as a whole in a patrone is previously wound up, the film is automatically delivered frame after frame each time a shutter release is performed. In the camera of this type, a film count value (the number of film frames) is counted up at the time of the preparatory winding and the count value thereof is counted down by delivery of each frame. Then, when the count value becomes zero, the film is unwound by continuing one frame delivery operation, considering that the photographings by the whole film are completed.

On the other hand, information of camera operation (during the preparatory winding, during one frame delivery, during the unwinding, during the standly and so forth) immediately before the start of the film delivery and immediately after the ending of the film delivery and the number of film frames at the time of the change of the film count value are written into the EEPROM.

The information of the camera operation and the number of film frames which are written into this EEPROM are read out during the processing at the initial stage after the camera becomes operable by the exchange of batteries and the like, whereby the film count value is set and it becomes possible to continue the operations interrupted by the exchange of batteries and the like.

However, in the case of the above-described conventional camera of the preparatory winding type, when the battery is taken out in the middle of one of the frame delivery after the photographing or the film delivery is interrupted due to the wear of the battery, there is a possibility that the final frame enters a photographing preventing region ("S" in the film).

That is, when the shutter release is performed in a state where the film count value showing the remaining amount of the film is "34" for example as shown in FIG. 4, after the photographing is made in this frame, one frame delivery is automatically performed, whereby normally, the count value is counted down to "33" after delivery of one frame.

However, during this one frame delivery, if the battery is withdrawn for example, then one frame delivery is interrupted. At this time, the information of the camera operation stored in the EEPROM indicates "during one frame delivery" and the number of film frames remains as "34".

Thereafter, when the batteries are exchanged, the information of camera operation and the number of film frames, which are stored in the EEPROM, are read out, "34" is set in the film count value and one frame delivery processing interrupted on the basis of the information of camera operation is restarted from the beginning. Then, when one frame delivery processing is completed, the film count value is counted down to be set at "33".

As apparent from FIG. 4, an interval having a length L is formed between the numbers of film frames "34" and "33" due to the above-described frame delivery. As the result, the frame of the film frame number "1" enters "S" of the film. Accordingly, such a problem is presented that, when the film is developed and printed, the frame of the film frame number "1" is cut.

SUMMARY OF THE INVENTION

The present invention has been developed to eliminate te the above-described disadvantages and has as its aim the provision of a camera capable of preventing photographing from being performed in a photographing preventing region even when exchange of batteries and the like are performed during one frame delivery.

To achieve the above-described object, the present invention is characterized in that the camera comprises: a memory means capable of electrically writing in and erasing, for holding the memory content without a backup power source; a film delivery means for electrically performing film delivery by power from a battery; a display means for displaying the number of film frames on the basis of a film count value; and a control means for controlling the film delivery means and causing the memory means to store information of camera operation immediately before the start of film delivery and the number of film frames when the film count value is changed, said control means being reset during the removal of the battery or during the voltage drop, reading out the information of camera operation immediately before the reset and the number of film frames from the memory means during the processing at the initial stage after the operation becomes possible by the exchange of batteries and the like, causing the operation corresponding to the information of camera operation to be continued, and changing the number of film frames thus read out by one and setting the changed number as the film count value when the information of camera operation indicates one frame delivery.

Furthermore, the film delivery control in the above-described control means is performed in such a way that a film as a whole in a patrone is previously wound up, the number of film frames thus wound up is counted, and thereafter, delivery of one frame is performed each time a shutter release is performed and the number of film frames is counted down after the completion of delivery of one frame. When the information of camera operations read out of the memory means indicates a state of frame delivery, the number of film frames is subtracted by one and this number is set as a film count number.

According to the present invention, the control means is reset during the removal of the battery and during the voltage drop, however, the memory means stores and holds the information of camera operation immediately before the reset and the number of film frames. Then, when the control means becomes operable by the exchange of batteries and the like, the control means reads out the information of camera operation immediately before the reset and the number of film frames from the memory means during the processing at the initial state thereafter, causes the operations corresponding to the information of camera operation to be continued and changes the number of film frames thus read out by one and this number is set as a film count number when the information of camera operation indicates one frame delivery. With this arrangement, the interrupted frame delivery is counted as one frame, so that the final frame can be prevented from entering the photographing preventing region.

BRIEF DESCRIPTION OF THE DRAWINGS

The exact nature of this invention, as well as other objects and advantages, will be readily apparent from consideration of the following specification relating to the accompanying drawings, in which like reference characters designate the same or similar parts throughout the figures thereof and wherein.

DESCRIPTION OF THE PREFERRED EMBODIMENT

Detailed description will hereafter be given of the preferred embodiment of the camera according to the present invention with reference to the accompanying drawings.

Figure 1:
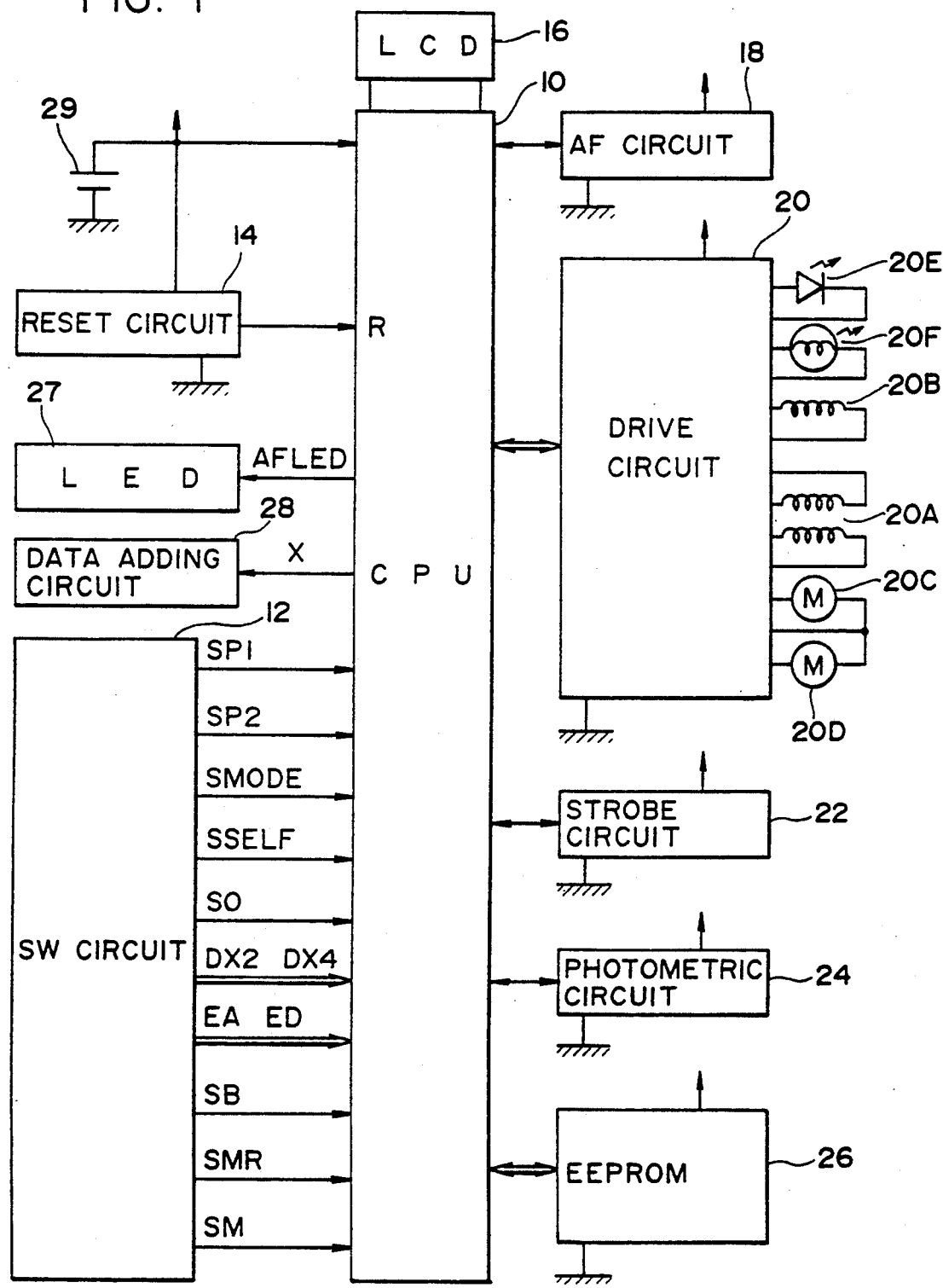
FIG. 1 is a block diagram showing one embodiment of a control section of the camera according to the present invention.

FIG. 1 is the block diagram showing one embodiment of the control section of the camera according to the present invention. This camera is the so-called preparatory winding type camera wherein the film as a whole in the patrone is previously wound up, and thereafter, the film is automatically delivered frame after frame each time a shutter release is performed.

As shown in FIG. 1, the control section of this camera mainly includes: a CPU 10; a switch circuit 12; a reset circuit 14; a liquid crystal device (hereinafter referred to as an "LCD") 16; an autofocus (AF) circuit 18; a drive circuit 20; a strobe circuit 22; a photometric circuit 24; an EEPROM 26 and so forth.

The switch circuit 12 is adapted to output signals from various switches into the CPU 10 and the following is the contents of the respective signals.

SP1: a signal showing whether a shutter release button is half-pressed or not

SP2: a signal showing whether a shutter release button is fully pressed or not

SMODE: a signal showing whether the Strobe mode is selected or not

SSELF: a signal showing whether a self photographing mode is selected or not

S0: a pulse signal from one frame switch, and four pulses are output for the film delivery of one frame DX2~DX4: data showing a degree of sensitivity of International Organization for Standardization (referred briefly to as "ISO") of a film EA~ED: positional data from an encoder, showing states of a photographing optical system such as telescopic, wide, macro and the like SB: a signal from a rear lid switch SMR: a signal from an unwinding switch SM: a signal from a main switch The reset circuit 14 outputs a reset signal to the CPU 10 when the voltage of a battery 28 for feeding the power to the respective circuit is lowered the a predetermined level or the battery is removed, and the LCD 16 displays the number of film frames, the content of the camera operation and the like on the basis of data showing the number of film frames, the content of the camera operation and the like from the CPU 10.

The AF circuit 18 measures a distance to an object by a trigonometrical survey, and, when the shutter release button is half-pressed and an order for measuring a distance is applied thereto from the CPU 10, measures a distance and outputs a result of measuring the distance to the CPU 10.

The drive circuit 20 drives a stepping motor 20A for controlling a shutter and exposure, a magnet 20B, a motor 20C for film delivering, a motor 20D for moving lenses and so forth in response to control signals from the CPU and controls a self light emitting diode (referred briefly to as an "LED") 20E and a preparatory winding lamp 20F in a manner to turn light on.

The strobe circuit 22 is charged during the strobe photographing and, when a flashing light order is input from the CPU 10 at a predetermined timing in association with the shutter release, the strobe circuit 22 causes the strobe to flash a light. Furthermore, the photometric circuit 24 is adapted to measure luminosity of an object and, when the shutter release button is half-pressed and a flashing light order is applied from the CPU 10, the photometric circuit outputs a signal showing the luminosity of the object at the time to the CPU 10.

The EEPROM 26 is adopted to store and hold the information of various types in the camera not to be lost even when the CPU 10 is reset by the reset circuit 14, and in this EEPROM 26, there are stored the information of camera operation during the preparatory winding of the film, during one frame delivery, during the unwinding, during the standby and so forth, and the number of film frames.

That is, the CPU 10 writes a state of camera operation showing the time during the preparatory winding, during one frame delivery or during the unwinding into the EEPROM 26 immediately before driving the motor 20C for film delivering through the drive circuit 20, and writes a state of camera operation showing the time during the standby into EEPROM 26 immediately after the stop of the motor 20C for film delivering after the preparatory winding or one frame delivery is completed. Furthermore, the CPU 10 includes a film counter for counting the number of film frames and writes a count value (the number of film frames) at a timing, at which the count value of this film counter is changed, into the EEPROM 26.

Then, after being reset by the reset circuit 14, the CPU 10 reads out the information of camera operation and the number of film frames from the EEPROM 26 during the processing at the initial stage after the batteries are exchanged, and continuously performs the camera operation when the CPU 10 is reset.

Incidentally, the start of the preparatory winding is performed in a state where no film count is made and when it is detected that the rear lid is turned from "open" to "close" by the signal SB from the rear lid switch. Furthermore, one frame delivery is performed after normal release is made in the shutter processing, and further, manual unwinding is performed when the number of film frames is more than one and the unwinding switch is turned on by the signal SMR from the unwinding switch or when the rear lid is mistakenly opened and closed again. This unwinding processing can be considered to be one frame delivery being continued. Further, designated at reference number 27 is the LED whose light is turned on by a signal AFLED output from the CPU 10 when the distance measuring is completed and 28 a date adding circuit for operating the date adding by a signal X output from the CPU 10 in synchronism with the shutter release.

The processing at the initial stage after the CPU is reset will hereafter be described.

Figure 2:
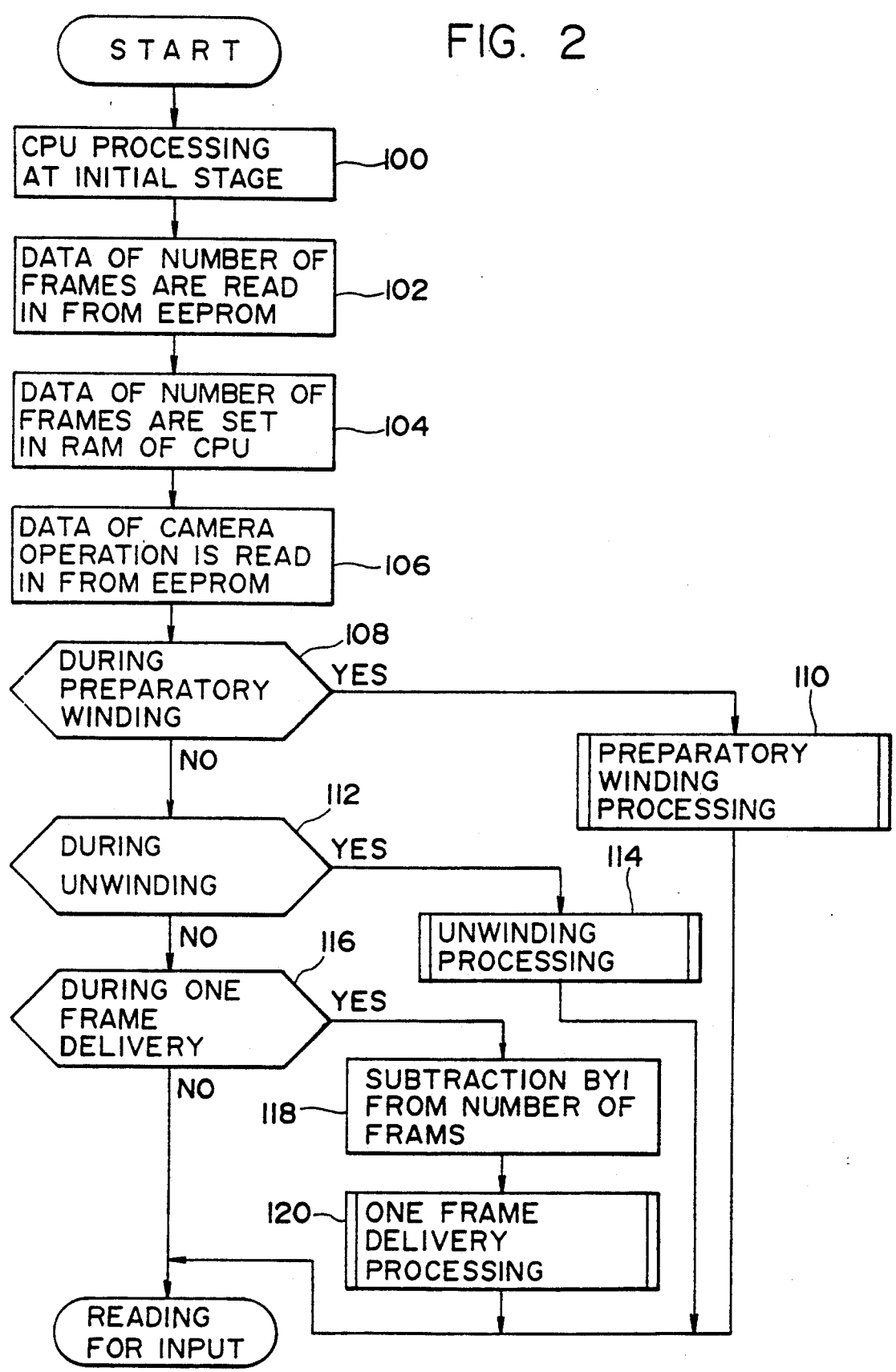
FIG. 2 is a flow chart used for explaining the operation of a central processing unit (hereinafter referred to as a "CPU") shown in FIG. 1.

After being reset by the reset circuit 14, the CPU 10 performs the processing shown in the flow chart in FIG. 2 during the processing at the initial stage after the batteries are exchanged.

Firstly, the processing at the initial stage for the CPU such as clearing of RAM (random access memory) in the CPU, setting of a register, allotment of input/output ports and so on is performed (Step 100). Next, the number of film frames is read in from the EEPROM 26 (STEP 102), and the number of film frames is set in the RAM (Step 104).

Subsequently, data on the camera operation are read in from the EEPROM 26 (Step 106). Then, the processing is discriminated whether the camera operation thus read in is during the preparatory winding or not (Step 108). When the processing is during the preparatory winding, a predetermined processing of preparatory winding is performed (Step 110). That is, the motor 20C for film delivering is driven till the winding of the film becomes impossible in a direction, in which the film is wound from the patrone, and thereafter, the film is unwound only by one frame, to thereby complete the preparatory winding. Incidentally, the reason why the film is unwound only by one frame resides in eliminating the disadvantage that a part of the final frame is cut when the film is automatically cut away from the patrone in a laboratory equipment. Furthermore, in the CPU 10, the count value showing the above-described data of the number of film frames is set, the count value is counted up each time four pulse signals SO generated due to the film delivery (when one frame is delivered), and, in the LCD 16, the count value (the number of film frames) is displayed.

On the other hand, when it is determined that the processing is not during the preparatory winding in Step 108, it is discriminated that the processing is during in the unwinding or not (Step 112), and, when the processing is during the unwinding, the processing of unwinding, in which one frame delivery is continuously made, is performed (Step 114). In this case also, the number of film frames is displayed similarly to the above.

Next, when it is determined that the processing is not during the unwinding in Step 112, it is determined whether the processing is during one frame delivery or not (Step 116), and, when the processing is during one frame delivery, firstly, the number of film frames subtracted by one from the number of film frames read out of the EEPROM 26 is set as the film count value (Step 118), and thereafter, one frame delivery is performed (Step 120). That is, when the motor 20C for the film delivery is driven in the winding direction and four pulse signals SO generated due to this film delivery are input, one frame delivery is regarded as being completed, the count value is counted down and the count value (the number of film frames) thereof is displayed in the LCD 16. Incidentally, when the number of film frames becomes zero during the count-down in this one frame delivery, one frame delivery is continued and the remaining film is unwound into the patrone.

Figure 3:
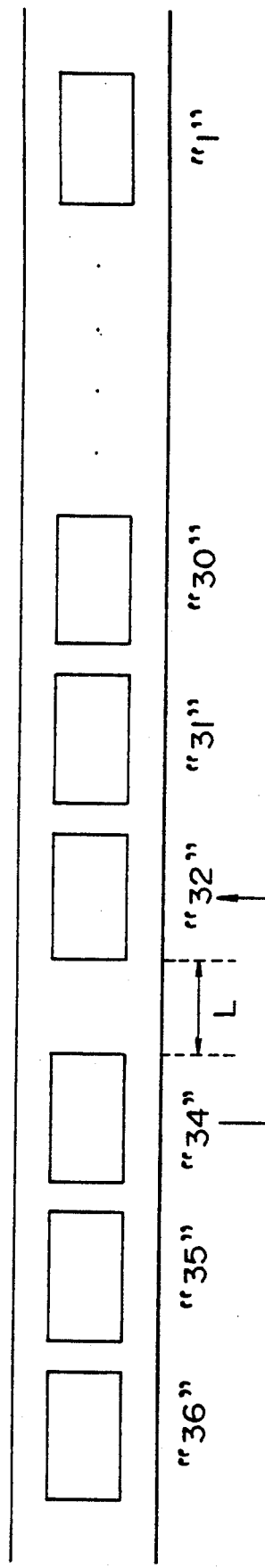
FIG. 3 is a view showing the number of film frames counted by the camera according to the present invention when the frame delivery is interrupted during one frame delivery.
Figure 4:
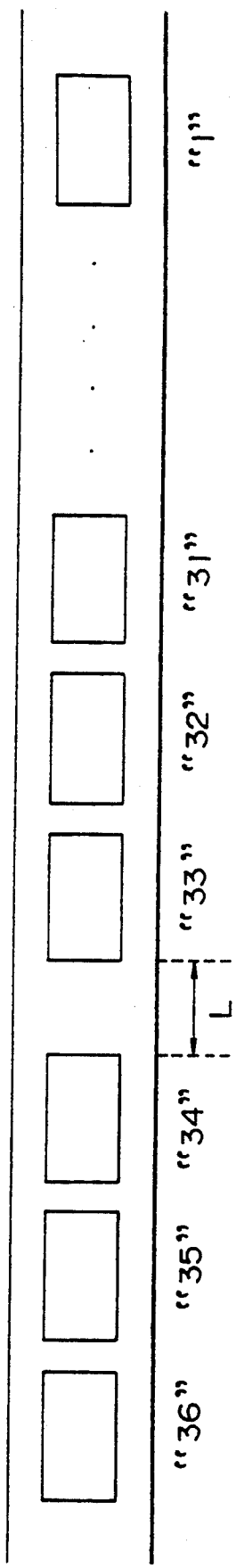
FIG. 4 is a view showing the number of film frames counted by the conventional camera when one frame delivery is interrupted during the frame delivery.

Description will hereafter be given of the processing at the initial stage after the CPU 10 is reset during one frame delivery with reference to FIG. 3.

Now, description will be given of the case where the voltage of the battery 28 is lowered than a predetermined level or the battery is removed during one frame delivery after the release is normally performed by the shutter processing when the number of film frames is "34".

In this case, the CPU 10 is reset to interrupt one frame delivery, in the EEPROM 26, there is recorded that one frame delivery is being performed as the data of the camera operation, and, as the data of the number of film frames, the data indicating "34" immediately before the start of one frame delivery are recorded. Thereafter, during the processing of the CPU at the initial stage by the exchange of batteries and the like, the processings shown in the flow chart in FIG. 2 (Steps 116, 118 and 120) are performed.

That is, the number of film frames "33" subtracted by one from the number of film frames "34" read out from the EEPROM 26 as described above is set as the film count value, and thereafter one frame delivery is performed. When one frame of the film delivery is completed, the above-described number of film frames "33" is counted down, whereby the number of film frames becomes "32" as shown in FIG. 3 and, in the LCD 16, the number of film frames is displayed.

As shown in FIG. 3, when one frame delivery is interrupted, the interval having the length L is formed between the frames disposed in front and rear of the interrupted frame delivery. However, since the count is performed such that one frame is decreased from the normal number of film frames, the frame of the number of film frames "1" can be prevented from entering "S" of the film.

Incidentally, in this embodiment, the camera of the preparatory winding type has been described, but, the present invention should not necessarily be limited to this, and the present invention is applicable to the case of the camera of the forward winding type, in which winding from the patrone is performed during one frame delivery. In this case, the count is performed such that one frame is decreased from the normal number of film frames. With this arrangement, the information of how many frames can be reliably photographed can be obtained, so that the final frame can be prevented from being cut when the film is automatically cut away from the patrone in the laboratory equipment.

As has been described hereinabove, in the camera according to the present invention, when the film delivery is interrupted during the removal of the battery or the voltage drop, and thereafter, the processing at the initial stage is performed on the basis of the information of camera operation and the number of film frames, which are recorded in the EEPROM, the operations corresponding to the information of camera operation is continued and, when the information of camera operation indicates one frame delivery, the number of film frames is changed by one from the number of film frames recorded immediately before the interruption and the count value is set, whereby the frame delivery interrupted by the exchange of batteries and the like during one frame delivery is also counted as one frame, so that the final frame can be prevented from entering the photographing preventing region of the film.

It should be understood, however, that there is no intention to limit the invention to the specific forms disclosed, but on the contrary, the invention is to cover all modifications, alternate constructions and equivalents falling within the spirit and scope of the invention as expressed in the appended claims.

I claim:

1. A camera comprising:
   a memory means capable of electrically writing in, erasing and holding the content of memory without a backup power source;
   a film delivery means for electrically delivering film by power from a battery;
   a display means for displaying the number of film frames on the basis of a film count value; and
   a control means for controlling said film delivering means and causing said memory means to store information of camera operation immediately before the start of the film delivery and the number of film frames at the time of change of said film count value, said control means being reset during the removal of said battery or the voltage drop, reading out the information of camera operation immediately before the reset and the number of film frames from said memory means during the processing at the initial stage after the operations become possible by the exchange of the batteries and the like and setting the number of film frames changed by one from the number of film frames recorded as said film count value when the information of camera operation indicates one frame delivery.

2. The camera as set forth in claim 1, wherein the film delivery control in said control means is performed such a way that the film as a whole in a patrone is wound up, the number of film frames thus wound up is counted, thereafter, the film is delivered frame after frame each time a shutter is released and the number of film frames is counted down after the ending of one frame delivery.

3. The camera as set forth in claim 2, wherein said control means sets the number of film frames subtracted by one as said film count value when the information of camera operation read out of said memory means indicates one frame delivery.

4. The camera as set forth in claim 3, wherein said control means continues one frame delivery to perform the unwinding processing of the film when the film count value becomes zero.

* * * * *